United States Patent [19]
Nagai et al.

[11] Patent Number: 5,549,340
[45] Date of Patent: Aug. 27, 1996

[54] SUCTION PAD

[75] Inventors: Shigekazu Nagai; Shuuzou Sakurai; Ryuichi Masui, all of Ibaraki-ken, Japan

[73] Assignee: SMC Kabushiki Kaisha, Tokyo, Japan

[21] Appl. No.: 317,650

[22] Filed: Sep. 30, 1994

[30] Foreign Application Priority Data

Oct. 14, 1993 [JP] Japan .................................. 5-256804
Nov. 30, 1993 [JP] Japan .................................. 5-300181

[51] Int. Cl.⁶ .................................................. B25J 15/06
[52] U.S. Cl. ........................................ 294/64.1; 901/40
[58] Field of Search ............................... 294/64.1, 64.3, 294/65; 29/740, 743; 269/21; 271/90; 279/3; 901/40

[56] References Cited

U.S. PATENT DOCUMENTS

| | | | |
|---|---|---|---|
| 2,876,026 | 3/1959 | Mancini | 294/64.1 X |
| 3,224,106 | 12/1965 | Way | 294/64.1 X |
| 3,608,946 | 9/1971 | Erickson et al. | 294/64.1 |
| 4,037,830 | 7/1977 | Poluzzi et al. | 294/64.1 X |
| 4,509,891 | 4/1985 | Lipscomb | 294/64.1 X |
| 4,553,892 | 11/1985 | Huffman, et al. | |
| 4,559,718 | 12/1985 | Tadokuro | 294/64.1 X |
| 4,662,668 | 5/1987 | Hufford | 294/64.1 |
| 4,904,012 | 2/1990 | Nishiguchi et al. | 294/64.1 |
| 5,013,075 | 5/1991 | Littell | 294/64.1 |
| 5,172,949 | 12/1992 | Nagai et al. | |
| 5,190,332 | 3/1993 | Nagai et al. | |
| 5,192,070 | 3/1993 | Nagai et al. | |
| 5,193,796 | 3/1993 | Nagai et al. | |
| 5,211,435 | 5/1993 | Nagai et al. | |
| 5,213,385 | 5/1993 | Nagai et al. | |

FOREIGN PATENT DOCUMENTS

| | | |
|---|---|---|
| 3532206 | 3/1986 | Germany . |
| 61-169541 | 10/1986 | Japan . |
| 62-172582 | 11/1987 | Japan . |

OTHER PUBLICATIONS

Patent Abstracts of Japan, vol. 9, No. 84, (M-371) (1807), Apr. 13, 1985, JP-59-212328, Dec. 1, 1984.
Research Disclosure, No. 308, p. 957, Dec. 1989, "Partial Circle Disk Vacuum Gripper".
Research Disclosure, No. 267, p. 434, Jul. 1986, "Portable Rigid Disk Handling Device".
IBM Technical Disclosure Bulletin, vol. 23, No. 5, Oct. 1980, M. J. Haney, et al., "Pickup Head For Apertured Flat Members".

*Primary Examiner*—Johnny D. Cherry
*Attorney, Agent, or Firm*—Oblon, Spivak, McClelland, Maier, & Neustadt, P.C.

[57] ABSTRACT

To attract a workpiece with a limited contact region, e.g., a doughnut-shaped compact disc having a central circular hole, a skirt of a substantially arcuate attractor is held against an annular land extending around the central circular hole. Suction forces are applied through a plurality of suction holes surrounded by the skirt to attract the annular land for attracting and carrying the compact disc. A mini disc having an annular step along a peripheral region around a central hole thereof may stably be attracted and carried by an attractor having inner and outer annular contact members which axially project different distances to contact the peripheral region and an area, respectively, that is radially spaced from the peripheral region by the annular step.

12 Claims, 11 Drawing Sheets

SUCTION PAD

BACKGROUND OF THE INVENTION

1. Field of the Invention

The present invention relates to a suction pad for attracting under suction a disk-shaped workpiece having a central hole, such as a mini disc, a compact disc, a laser disc, or the like and carrying the attracted disk-shaped workpiece to a desired position.

2. Description of the Related Art

Suction pads connected to a source of vacuum have heretofore been widely used to attract and carry workpieces. Such a suction pad comprises a main body connected to a source of vacuum through a tube or the like mounted in a port, and a flexible attracting portion integral with the main body for contacting a surface of a workpiece when the workpiece is to be attracted by the suction pad.

One known suction pad for attracting under suction a substantially disk-shaped workpiece having a central hole is disclosed in Japanese laid-open utility model publications Nos. 61-169541 and 62-172582, for example.

The suction pad disclosed in Japanese laid-open utility model publication No. 61-169541 is shown in FIG. 13A of the accompanying drawings. As shown in FIG. 13A, the suction pad, generally designated by the reference numeral 2, comprises a larger-diameter pad 6 in the form of a substantially circular dome which is held in the bottom of a housing 4, and a smaller-diameter hermetic seal ring 10 supported coaxially with the housing 4 by a centering shaft 8. Each of the larger-diameter pad 6 and the smaller-diameter hermetic seal ring 10 serves as a pad for attracting a surface of a workpiece 12 under suction. The larger-diameter pad 6 and the smaller-diameter hermetic seal ring 10 are of a double structure in which they are held coaxially with each other. The hermetic seal ring 10 supports a land 16 on its bottom surface for fitting in a hole 14 defined centrally in a workpiece 12 to position the suction pad 2 with respect to the workpiece 12. For attracting the workpiece 12 under suction, the hermetic seal ring 10 is held against the workpiece 12 along an inner peripheral region around the hole 14 thereby to close the hole 14, and the pad 6 which is larger in diameter than the hermetic seal ring 10 is brought into abutment against the workpiece 12. Then, a negative pressure or vacuum is developed in a space between the hermetic seal ring 10 and the pad 6 for thereby attracting the workpiece 12 under suction.

FIG. 13B of the accompanying drawings shows the suction pad disclosed in Japanese laid-open utility model publication No. 62-172582. As shown in FIG. 13B, the suction pad, generally designated by the reference numeral 18, has a pad support 22 with a vacuum hole 20 defined axially in its center. The suction pad 18 also has a smaller-diameter inner seal 24 fitted in the pad support 22 and a larger-diameter outer seal 26 fitted over the pad support 22. The inner seal 24 and the outer seal 26, each serving as a pad, are of a double structure in which they are held coaxially with each other. In order to attract a workpiece 28 under suction, the inner seal 24 closes a hole 29 defined centrally in the workpiece 28, and the outer seal 26 is held against the workpiece 28 around the inner seal 24. Then, a negative pressure or vacuum is developed in a space between the inner and outer seals 24, 26 for thereby attracting the workpiece 28 under suction.

As described above, the conventional suction pads 2, 18 have two coaxially positioned pads of different diameters for attracting the doughnut-shaped workpieces 12, 28.

For attracting and carrying a doughnut-shaped workpiece having a central hole such as a compact disc, a mini disc, or the like, a suction pad is required to be held against an information-free area of the workpiece, i.e., an inner peripheral region around the central hole or an outer circumferential region of the workpiece. This is because information is recorded in a region between the inner peripheral region around the central hole and the outer circumferential region of the workpiece, and if the suction pad contacted the information-recorded region, it would possibly damage the information-recorded region, making it difficult for a pickup to read the recorded information from that region.

If such a workpiece which has limited pad-contact regions is to be attracted and carried by the conventional suction pads 2, 18, then it is necessary to position the smaller- and larger-diameter pads accurately on the inner peripheral region and the outer circumferential region, respectively. Consequently, the smaller- and larger-diameter pads need to be assembled accurately on the main body of the suction pads, and have to be formed with high dimensional accuracy. Actually, however, the smaller- and larger-diameter pads suffer dimensional errors owing to irregularities introduced when they are manufactured, and such dimensional errors prevent them from being assembled accurately.

In a process of manufacturing a compact disc, a mini disc, or a laser disc, the disc is positioned and held by a support rod which projects though the central hole of the disc. When the suction pads 2, 18 are used to attract the disc which is positioned and held by the support rod, since the support rod presents an obstacle to the suction pads 2, 18, the suction pads 2, 18 find it difficult to attract the disc.

SUMMARY OF THE INVENTION

It is therefore an object of the present invention to provide a suction pad capable of easily and smoothly attracting and carrying a doughnut-shaped workpiece with a central hole defined therein.

Another object of the present invention is to provide a suction pad capable of easily and smoothly attracting and carrying a doughnut-shaped workpiece having an annular step in a peripheral region around a central hole defined in the workpiece.

According to an aspect of the present invention, there is provided a suction pad for attracting a workpiece having a hole defined therein, comprising an attractor of a flexible material for abutment against the workpiece along a peripheral region thereof around the hole, and a main body joined to the attractor and having a communication passage defined therein, for supplying suction forces from a source of vacuum through the communication passage to the attractor, the main body having a through opening for being kept in registry with the hole of the workpiece when the attractor is held in abutment against the workpiece along the peripheral region thereof.

The attractor and the main body are integrally formed with each other, further comprising a reinforcing member disposed between the attractor and the main body for holding the attractor snugly against the peripheral region of the workpiece.

Each of the attractor and the main body is of a curved shape extending along the peripheral region of the workpiece and has opposite ends spaced from each other.

To attract the workpiece with the hole, the attractor is held against the workpiece along the peripheral region, and suction forces are applied to the attractor from the source of vacuum through the communication passage to attract the workpiece. Since the main body has the through opening for registry with the hole of the workpiece, even when the workpiece is supported by a support rod or the like fitted in the hole thereof, the suction pad can attract the workpiece without physical interference with the support rod.

According to another aspect of the present invention, there is provided a suction pad for attracting a workpiece having a hole defined therein, comprising an attractor of a flexible material for abutment against the workpiece along a peripheral region thereof around the hole, and a main body joined to the attractor and having a communication passage defined therein, for supplying suction forces from a source of vacuum through the communication passage to the attractor, the main body having a through opening for being kept in registry with the hole of the workpiece when the attractor is held in abutment against the workpiece along the peripheral region thereof, the attractor having a pair of radially spaced annular contact members axially projecting different distances, respectively, toward the workpiece for contacting the peripheral region and an area of the workpiece, respectively, which is radially spaced from the peripheral region by an annular step.

When the attractor is held against the workpiece along the peripheral region, and suction forces are applied to the attractor from the source of vacuum through the communication passage to attract the workpiece, the annular contact members are held neatly against the peripheral region and the area, respectively. Therefore, the attractor can reliably attract the workpiece without creating any undesirable gap across the step. The through opening of the main body allows the suction pad to attract the workpiece reliably while clearing a support rod or the like which is fitted in the hole of the workpiece and supports the workpiece.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
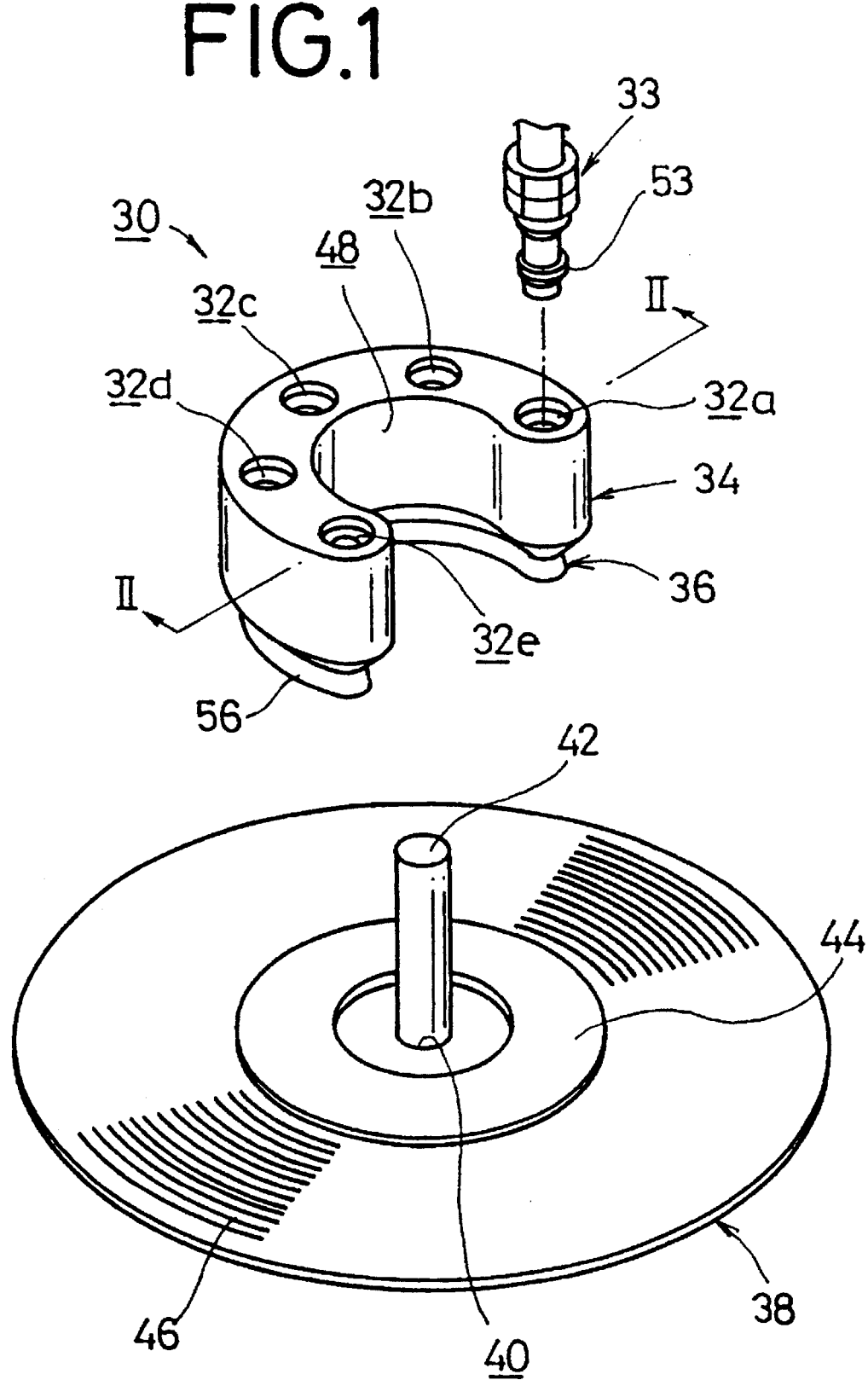
FIG. 1 is a perspective view of a suction pad according to a first embodiment of the present invention.
Figure 2:
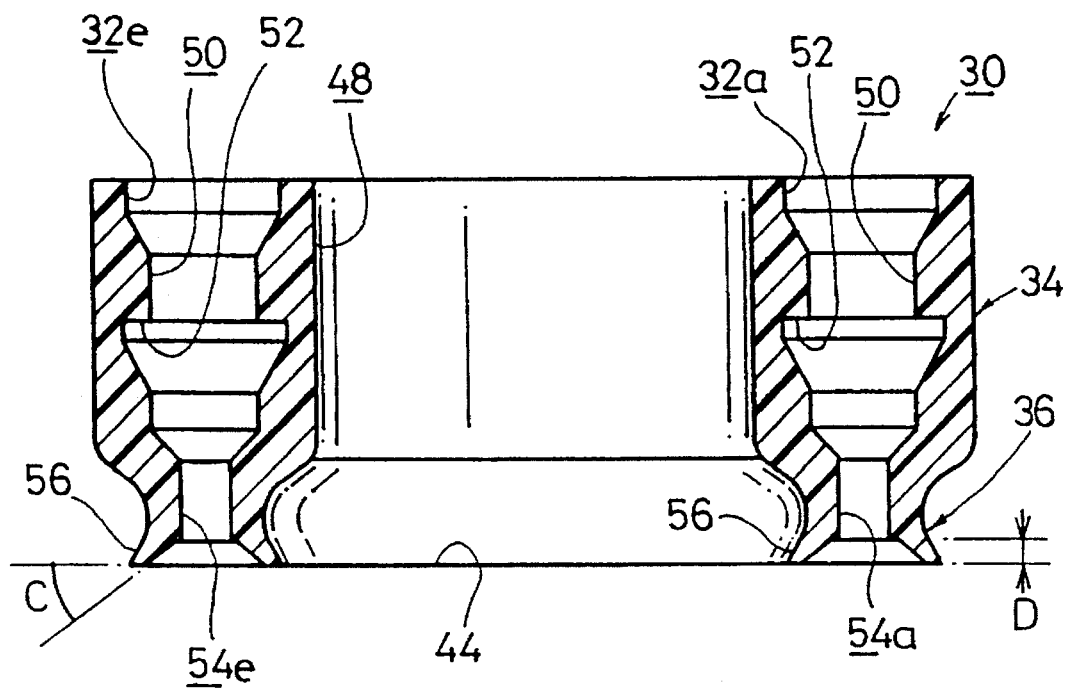
FIG. 2 is a vertical cross-sectional view taken along line II—II of FIG. 1.
Figure 3:
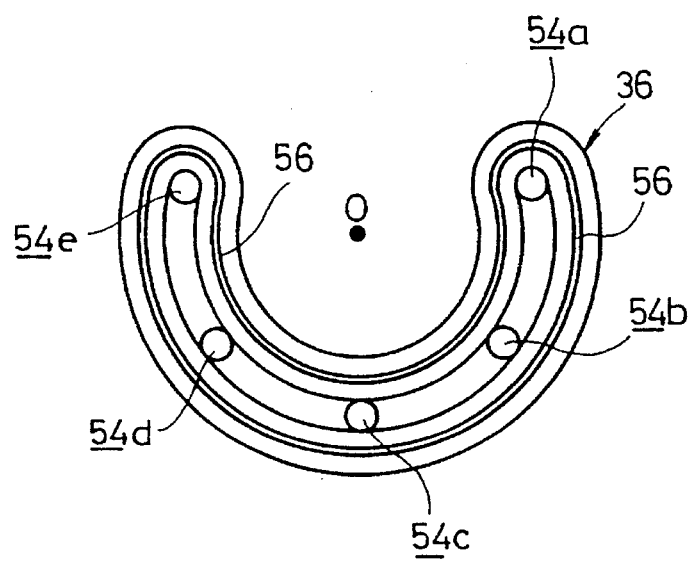
FIG. 3 is a bottom view of the suction pad shown in FIG. 1.

FIGS. 1 through 3 show a first embodiment of a suction pad according to a first embodiment of the present invention. In FIG. 1, the suction pad is in a position about to attract a compact disc under suction.

The suction pad, generally designated by the reference numeral 30, is in the form of a substantially arcuate block comprising a main body 34 to be connected to a source of vacuum (not shown) through an adapter 33, and an attractor 36 integrally formed with the bottom of the main body 34. The suction pad 30 is integrally formed of a flexible material such as NBR (acrylonitrile butadiene rubber), silicone rubber, urethane rubber, fluororubber, or the like.

In this embodiment, a workpiece to be attracted by the suction pad 30 is a compact disc 38 having a hole 40 defined substantially centrally therein. The compact disc 38 is held by a support rod 42 which engages in the hole 40. The compact disc 38 has an annular land 44 disposed near and around the hole 40, the annular land 44 being free of any recorded information. The compact disc 38 also has a recording region 46 where information is recorded, between the annular land 44 and an outer circumferential edge of the compact disc 38.

The main body 34 has opposite ends spaced a certain distance from each other and extends substantially arcuately in surrounding relation to an axially through opening 48 which is defined substantially centrally therein. The main body 34 also has a plurality of ports 32a, 32b, 32c, 32d, 32e defined in an upper surface thereof at certain angular intervals, the ports 32a~32e being connectable to corresponding adapters 33. As shown in FIG. 2, the ports 32a~32e communicate with stepped holes 50, respectively, defined in and extending axially through the main body 34 toward the attractor 36. The stepped holes 50 have respective steps 52 for engaging annular ridges 53 of the adapters 33 to retain the adapters 33 in the ports 32a~32e.

As shown in FIGS. 2 and 3, the attractor 36 has an arcuate array of equally spaced suction holes 54a, 54b, 54c, 54d, 54e defined therein and arranged along the bottom of the main body 34. The suction holes 54a~54e are held in communication with the stepped holes 50, respectively, and have respective centers positioned on an arc around a center O which is aligned with the center of curvature of the arcuate main body 34.

The attractor 36 also has a flexible skirt 56 surrounding the suction holes 54a~54e on its lower side. The skirt 56 is also of an arcuate shape which can be positionally aligned with the annular land 44 of the compact disc 38, and has a radial width substantially equal to the radial width of the annular land 44 (see FIG. 3). The skirt 56 has an inner wall surface inclined at an angle C of 45° or less with respect to the plane of the annular land 44. As shown in FIG. 2, the skirt 56 has a distal or lower end which is spaced from its proximal or upper end by a distance D of 0.8 mm or less. With the angle C and the distance D being thus selected, when suction forces are generated in advance in the suction holes 54a–54e before attracting the compact disc 38, the skirt 56 is prevented from being bent over into the suction holes 54a–54e.

Operation of the suction pad 30 to attract and carry the compact disc 38 from a production line to another production line in the manufacture of the compact disc 38 will be described below.

The suction pad 30 is fixed to the distal end of a displaceable arm of a carrier robot, for example, via the adapters 33. Then, the arm of the robot is displaced to position the suction pad 30 over the compact disc 38 which is disposed on a production line. Thereafter, the arm is lowered until the skirt 56 of the suction pad 30 is brought into abutment against the annular land 44 of the compact disc 38. At this time, since the skirt 56 is shaped substantially coextensively radially with the annular land 44, the skirt 56 is held in contact with the annular land 44, but kept out of contact with the recording region 46. Because the main body 34 extends arcuately around the opening 48 which is open laterally of the main body 34, the main body 34 is kept out of physical interference with the support rod 42, and can approach the compact disc 38 in a sufficiently free choice of directions.

After the skirt 56 of the attractor 36 is held against the annular land 44 of the compact disc 38, a negative pressure or a vacuum is developed in the suction holes 54a–54e and the skirt 56 through the port which is connected to the source of vacuum through the adapter 33, for thereby generating suction forces to reliably attract the compact disc 38 against the skirt 56. The suction forces may start to be produced either at the same time or before the skirt 56 is brought into abutment against the annular land 44. If the suction forces start to be generated before the skirt 56 is brought into abutment against the annular land 44, then since the skirt 56 is not bent over into the suction holes 54a–54e under the suction forces developed therein, the suction pad 30 can easily and smoothly attract the compact disc 38. Therefore, the suction pad 30 can reliably attract the compact disc 38 and carry the attracted compact disc 38 to another production line.

Figure 4:
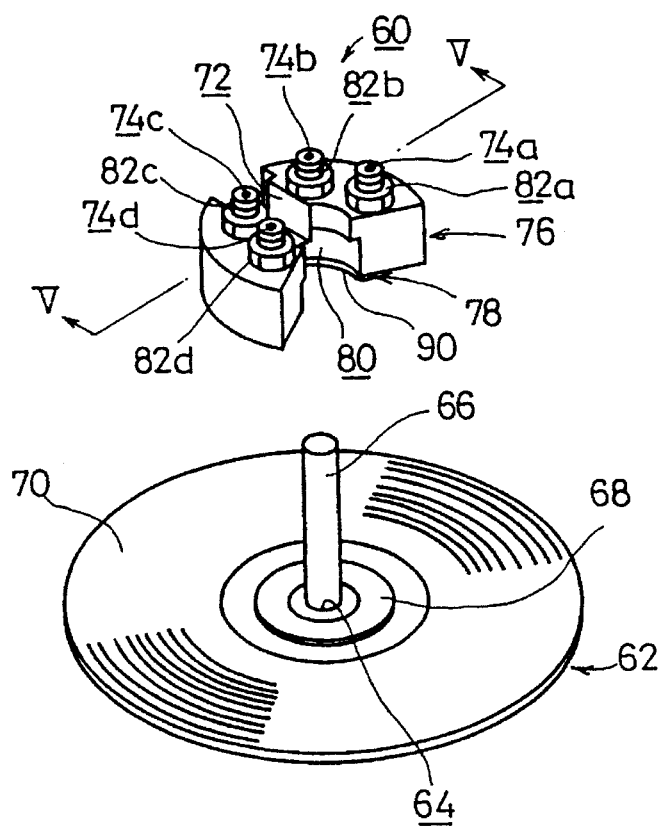
FIG. 4 is a perspective view of a suction pad according to a second embodiment of the present invention.
Figure 5A:
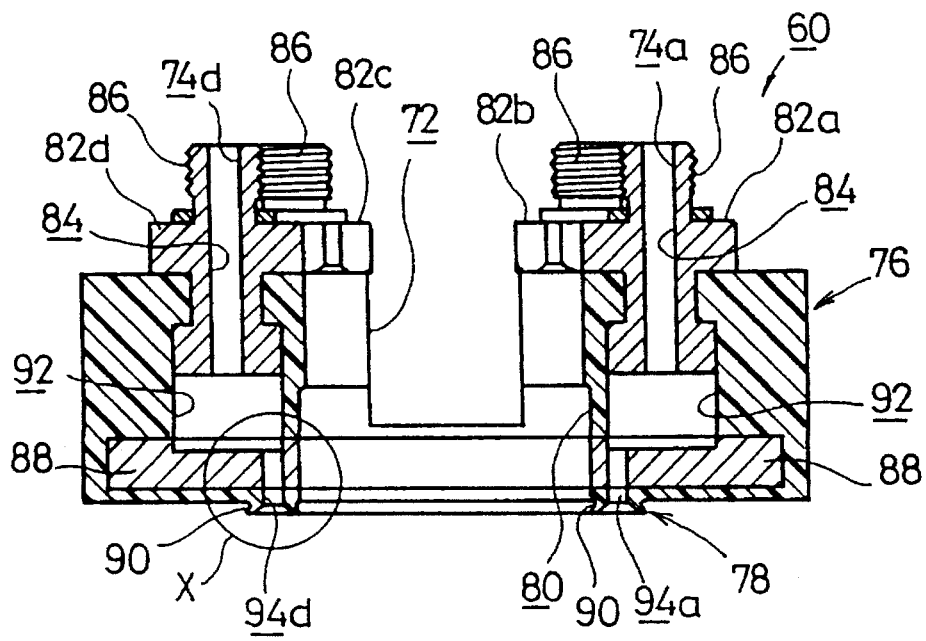
FIG. 5A is a vertical cross-sectional view taken along line V—V of FIG. 4.
Figure 5B:
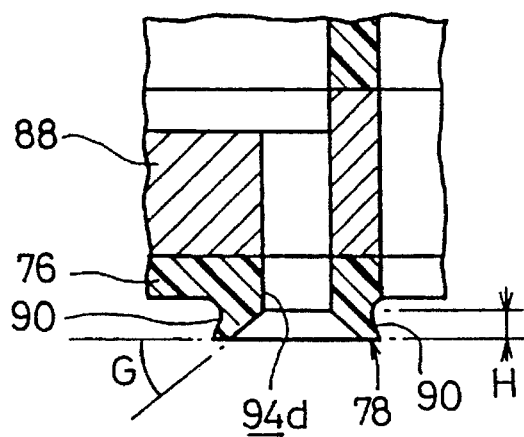
FIG. 5B is an enlarged fragmentary cross-sectional view of an encircled portion X of the suction pad shown in FIG. 5A.
Figure 6:
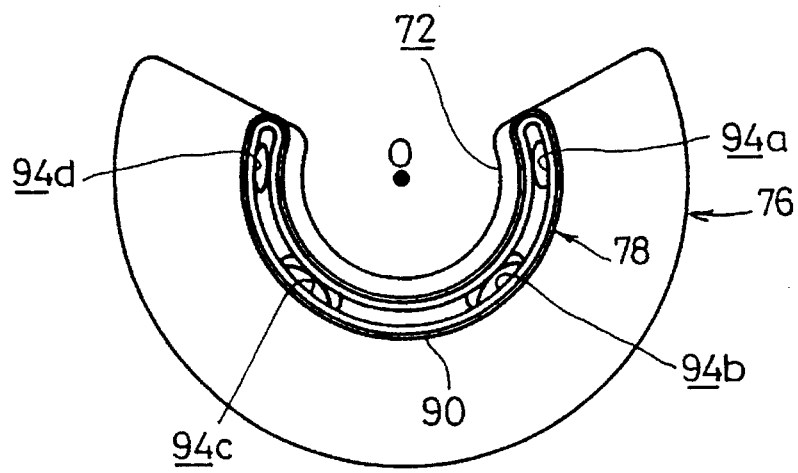
FIG. 6 is a bottom view of the suction pad shown in FIG. 4.

FIGS. 4 through 6 show a second embodiment of a suction pad 60 according to a second embodiment of the present invention.

In this embodiment, the suction pad 60 is arranged to attract a workpiece in the form of a mini disc 62 which is smaller in diameter than the compact disc 38. The mini disc 62 has a hole 64 defined substantially centrally therein. The mini disc 62 is held by a support rod 66 which engages in the hole 64. The mini disc 62 has an annular land 68 disposed near and around the hole 64 and free of any recorded information, and a recording region 70 where information is recorded, positioned radially outwardly of the annular land 68.

As shown in FIGS. 4 and 5A, the suction pad 60 comprises a main body 76 composed of two symmetrically positioned arcuate blocks coupled to each other through a recessed portion 72 and having a plurality of ports 74a, 74b, 74c, 74d defined in upper surfaces thereof for connection to a source of vacuum (not shown) through tubes (not shown), and an attractor 78 integrally formed with the bottom of the main body 76. The suction pad 60 may be integrally formed of the same flexible material as that of the suction pad 30 according to the first embodiment.

The main body 76 is of an arcuate shape which can be positionally aligned with the annular land 68 of the mini disc 62. The main body 76 extends substantially arcuately in surrounding relation to an axially through opening 80 which is defined substantially centrally therein and aligned with the hole 64 of the mini disc 62, the opening 80 being open laterally of the arcuate blocks. A plurality of pipe joints 82a, 82b, 82c, 82d spaced at angular intervals are fitted respectively in holes that are defined in an upper surface of the main body 76, and have respective holes 84 extending axially therethrough toward the attractor 78. The holes 84 include respective ports 74a, 74b, 74c, 74d at their upper inlet portions in externally threaded upper ends 86 of the respective pipe joints 82a–82d. Tubes or the like (not shown) connected to the source of vacuum are threaded over the externally threaded upper ends 86 in communication with the ports 74a, 74b, 74c, 74d.

A metal reinforcing plate 88 having an arcuate shape similar to the arcuate shape of the main body 76 is embedded in the main body 76 near the bottom thereof. The metal reinforcing plate 88 serves to keep a skirt 90 (described later on) of the attractor 78 flat in substantially the same plane.

As shown in FIG. 6, the attractor 78 has an arcuate array of equally spaced suction holes 94a, 94b, 94c, 94d defined therein and arranged along the bottom of the main body 76 closely to the opening 80. The suction holes 94a–94d have lower inlet ends which are oblong or elongate along the arcuate array thereof. The suction holes 94a–94d are positioned on an arc around a center O which is aligned with the center of curvature of the arcuate main body 76.

The attractor 78 also has a flexible skirt 90 surrounding the suction holes 94a–94d on its lower side. The skirt 90 is also of an arcuate shape which can be positionally aligned with the annular land 68 of the mini disc 62, and has a radial width equal to the radial width of the annular land 68. The skirt 90 has an inner wall surface inclined at an angle G of 45° or less with respect to the plane of the annular land 68. As shown in FIG. 5B, the skirt 90 has a distal or lower end which is spaced from its proximal or upper end by a distance H of 0.5 mm or less. Since the angle G and the distance H are of these values, when suction forces are generated in advance in the suction holes 94a–94d before attracting the mini disc 62, the skirt 90 is prevented from being bent over into the suction holes 94a–94d.

The annular land 68 of the mini disc 62 which will be attracted by the suction pad 60 is of a smaller area than the annular land 44 of the compact disc 38 which will be attracted by the suction pad 30 shown in FIG. 1. Inasmuch as the skirt 90 is of a shape corresponding to the shape of the annular land 68 of the mini disc 62, the suction pad 60 can attract the mini disc 62 under suction without the skirt 90 being held in contact with the recording region 70 where information is recorded on the mini disc 62.

Because of the smaller annular land 68, the suction pad 60 is smaller in size than the suction pad 30 shown in FIG. 1. However, since the plate 88 is disposed in the main body 76 to keep the skirt 90 flat, the skirt 90 is maintained flat against the annular land 68 around the hole 64, and hence can reliably attract and hold the annular land 68.

FIGS. 7 through 11 shows a third embodiment of a suction pad 130 according to a third embodiment of the present invention.

Figure 7:
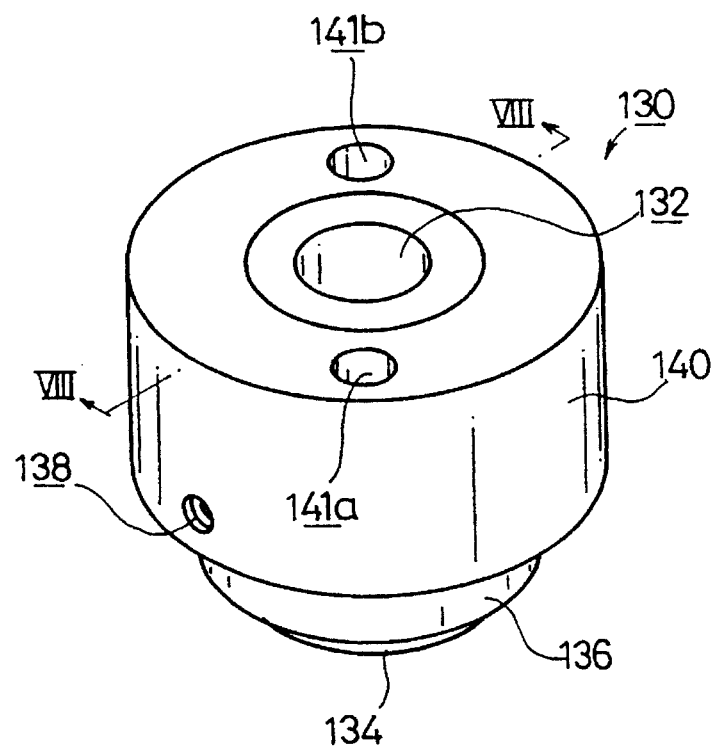
FIG. 7 is a perspective view of a suction pad according to a third embodiment of the present invention.
Figure 8:
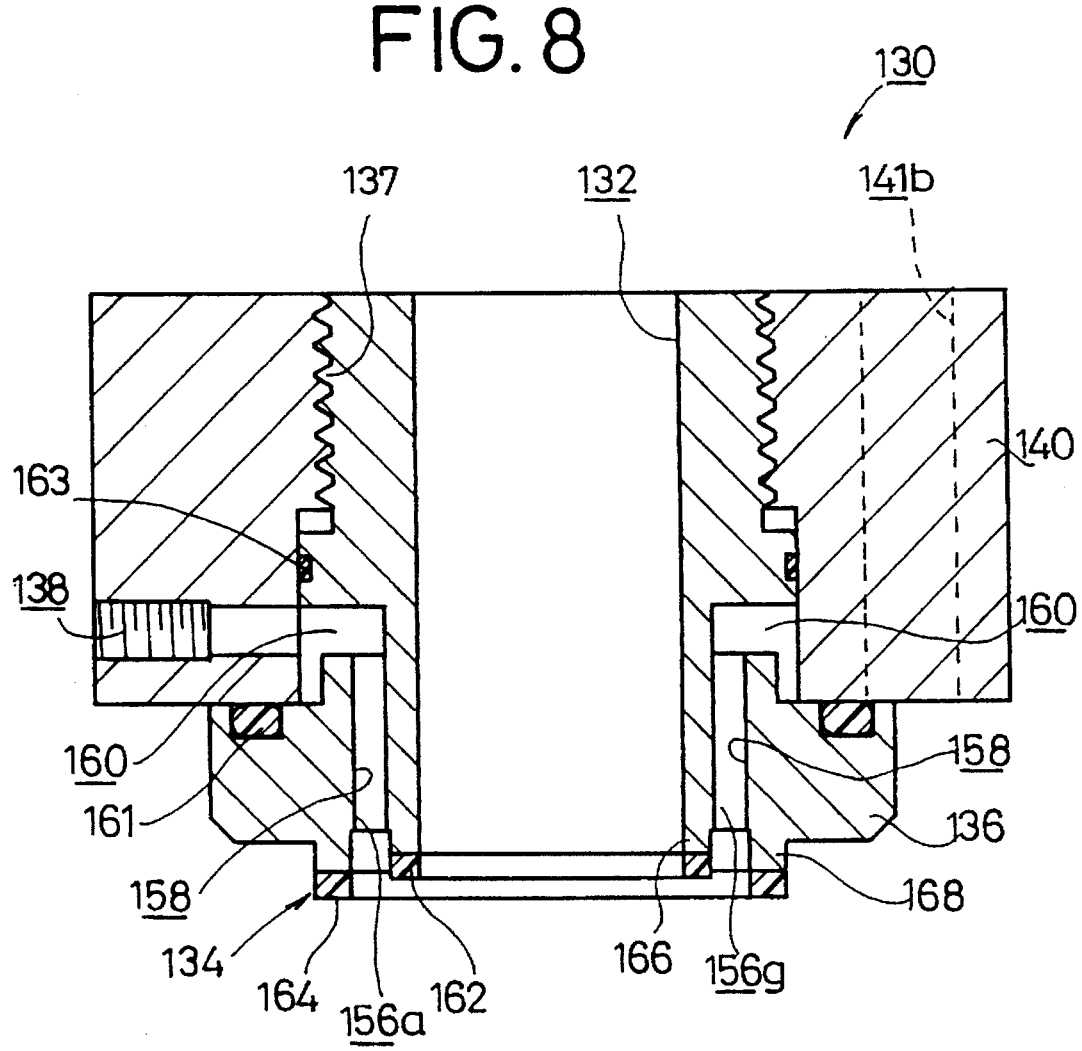
FIG. 8 is a vertical cross-sectional view taken along line VIII—VIII of FIG. 7.

As shown in FIGS. 7 and 8, the suction pad 130 comprises a cylindrical member 136 having a through opening 132 defined substantially centrally therein and an attractor 134 disposed on its bottom for contacting a workpiece, and an annular member 140 fitted over the cylindrical member 136 through threaded surfaces 137 and having a laterally open port 138 for connection to a source of vacuum (not shown)

through a tube or the like. The attractor 134 is made of a flexible material, and the cylindrical member 136 and the annular member 140, which jointly serve as a main body, are made of a metal such as aluminum or the like.

The annular member 140 has a pair of diametrically opposite attachment holes 141a, 141b defined axially therethrough. The suction pad 130 is supported on a robot arm 144 (see FIGS. 10 and 11) by rods 143a, 143b which are fitted in the respective attachment holes 141a, 141b. Coil springs 145a, 145b are disposed around the respective rods 143a, 143b between the robot arm 144 and the suction pad 130 for dampening shocks applied to the suction pad 130 when the suction pad 130 attracts a workpiece.

In this embodiment, the workpiece attracted by the suction pad 130 is a mini disc 146 having a substantially circular hole 148 defined substantially centrally therein. A stack of mini discs 146 is supported by a support rod 150 extending through the holes 148 of the respective mini discs 146. Each of the mini discs 146 has an annular land 152 disposed near and around the hole 148 and free of any recorded information, and a recording region 154 where information is recorded, positioned radially outwardly of the annular land 152 and separated therefrom by an annular step 153. The recording region 154 includes an annular information-free flat area adjacent to the annular step 153.

Figure 9:
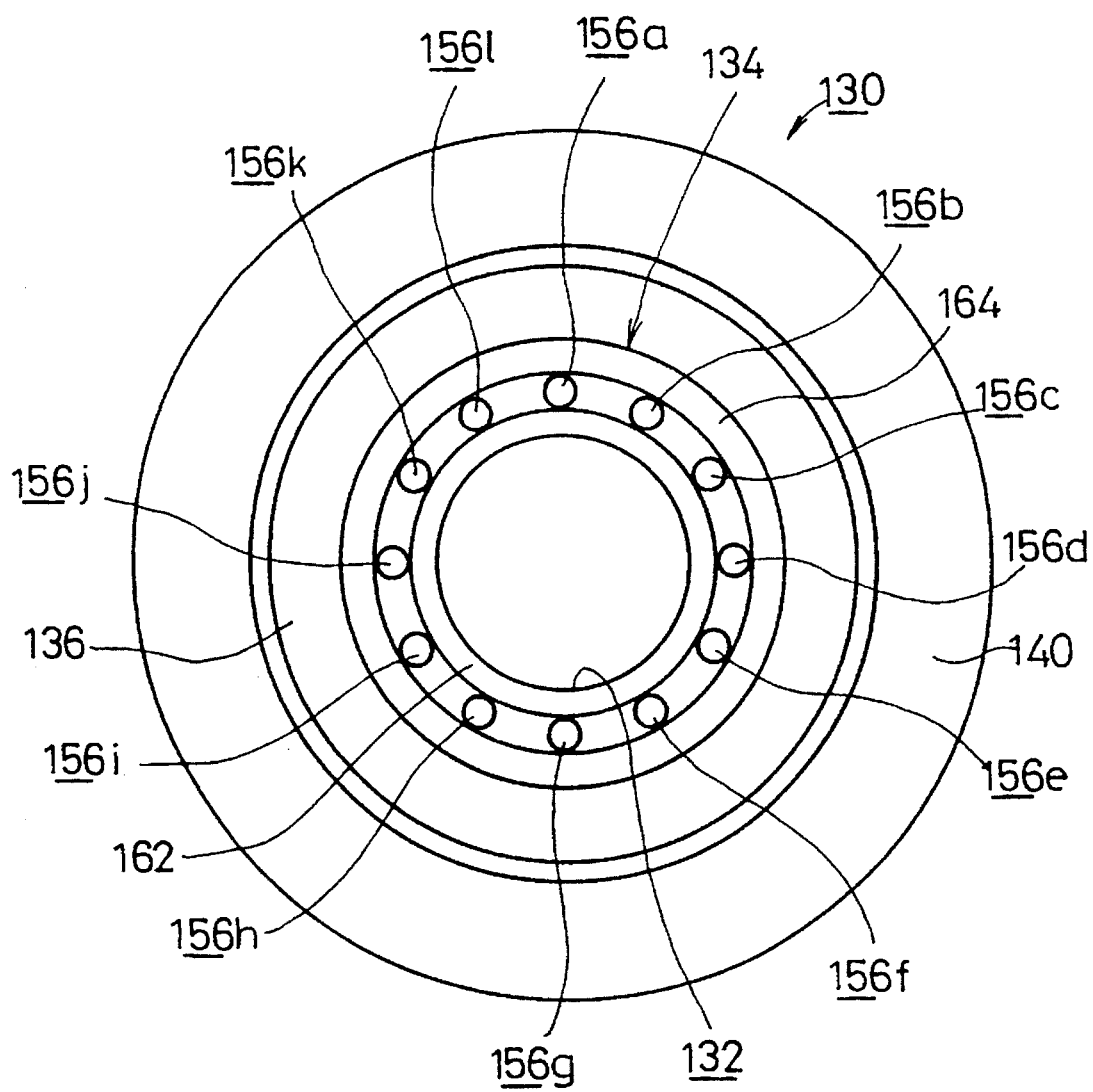
FIG. 9 is a bottom view of the suction pad shown in FIG. 7.

As shown in FIGS. 8 and 9, the attractor 134 has an annular array of suction holes 156a~156l defined axially therethrough at equal angular intervals and held in communication with an annular passage 160 through a plurality of respective axial passages 158 which are defined in the cylindrical member 136 in communication with the suction holes 156a~156l. The annular passage 160 is defined between an outer circumferential surface of the cylindrical member 136 and an inner circumferential surface of the annular member 140, and communicates with the port 138. Seal rings 161, 163 are interposed between the cylindrical member 136 and the annular member 140 in the vicinity of and one on each side of the annular passage 160 for hermetically sealing the annular passage 160.

The attractor 134 comprises an inner annular contact member 162 and an outer annular contact member 164, both made of a flexible material such as silicone rubber or the like. The inner annular contact member 162 is positioned axially upwardly of and radially inwardly of the outer annular contact member 164. Stated otherwise, the outer annular contact member 164 projects axially a larger distance toward the mini discs 146 than the inner annular contact member 162. The inner annular contact member 162 and the outer annular contact member 164 are integrally joined as by curing to first and second annular ridges 166, 168, respectively, on the bottom of the cylindrical member 136.

When the suction pad 130 attracts a mini disc 146, the inner annular contact member 162 is held in contact with the annular land 152 around the hole 148 of the mini disc 146, and the outer annular contact member 164 is held in contact with the annular information-free flat area of the recording region 154 adjacent to the annular step 153.

The inner annular contact member 162 and the outer annular contact member 164 are fixed respectively to the first and second annular ridges 166, 168 which project different distances axially toward the workpiece, and are axially staggered with respect to each other by the annular step 153 between the annular land 152 and the recording region 154. The inner annular contact member 162 and the outer annular contact member 164 have substantially flat contact surfaces for contacting the mini disc 146.

Since the inner annular contact member 162 and the outer annular contact member 164 have substantially flat contact surfaces for contacting the workpiece, they are prevented from being turned radially inwardly when the suction pad 130 attracts the workpiece, and may project axially outwardly different distances to accommodate the annular step 153 on the mini disc 146. The flexible material such as silicone rubber or the like, of which the inner annular contact member 162 and the outer annular contact member 164 are made, should preferably have a hardness less than 20° in a spring type hardness test (JIS K 6301).

Operation of the suction pad 130 to attract and carry a mini disc 146 from a production line to another production line in the manufacture of mini discs 146 will be described below.

Figure 10:
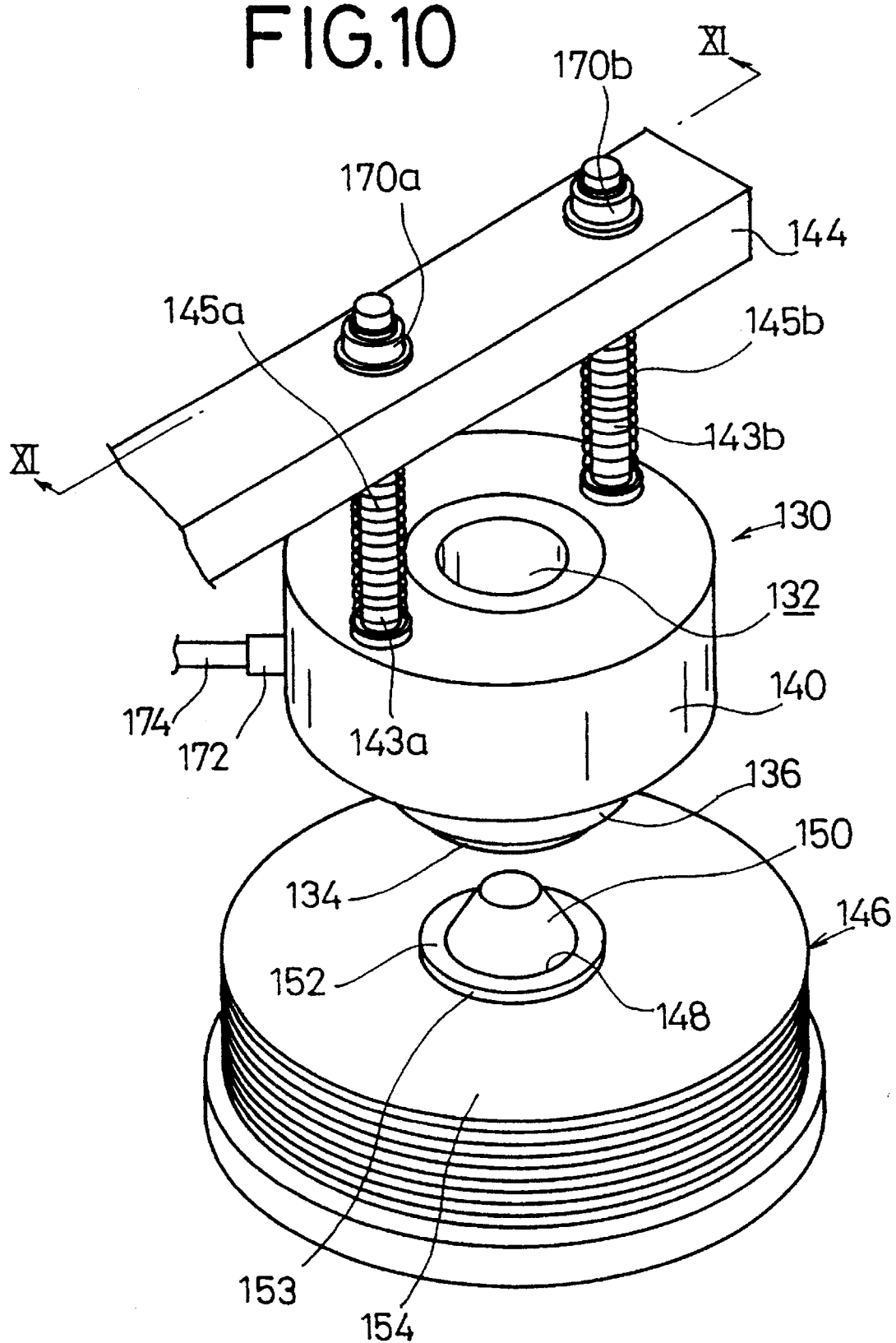
FIG. 10 is a perspective view illustrating the manner in which the suction pad shown in FIG. 7 operates.
Figure 11:
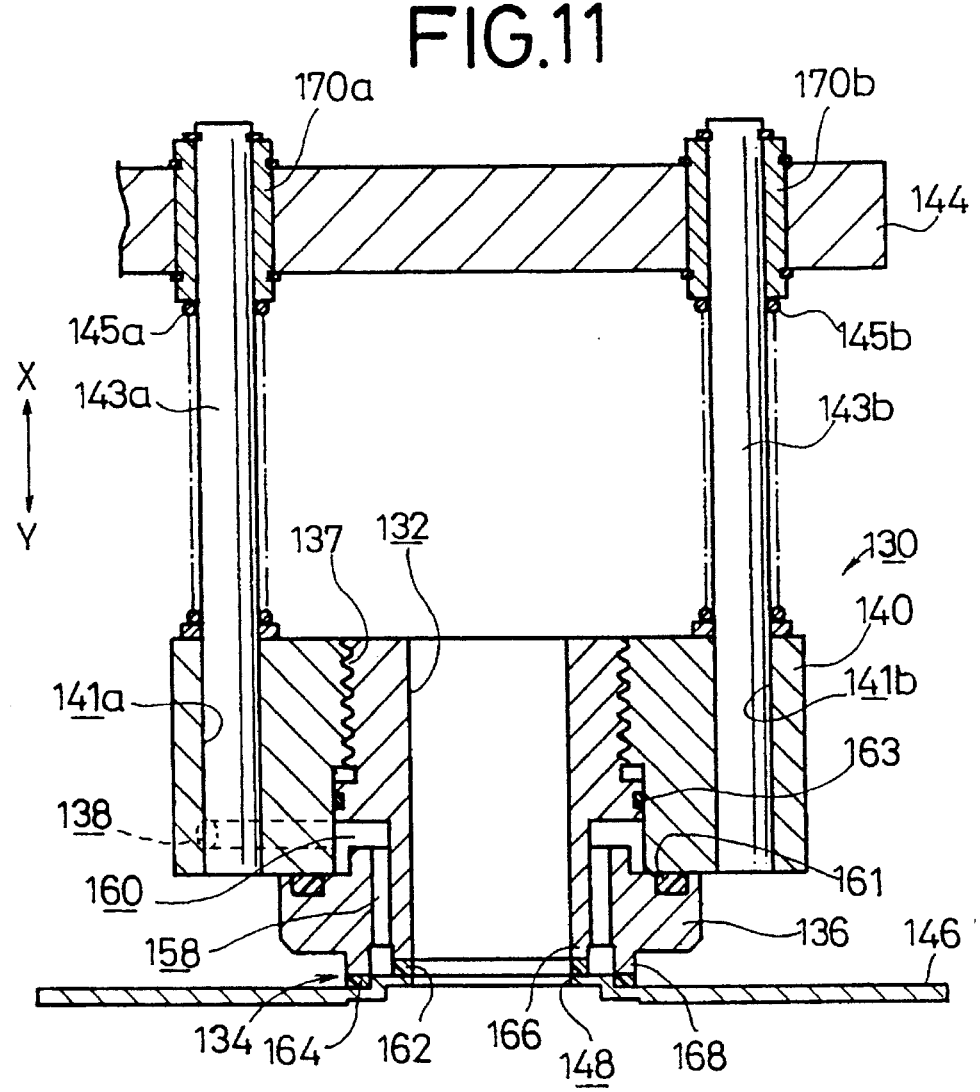
FIG. 11 is a vertical cross-sectional view taken along line XI—XI of FIG. 10.
Figure 11:
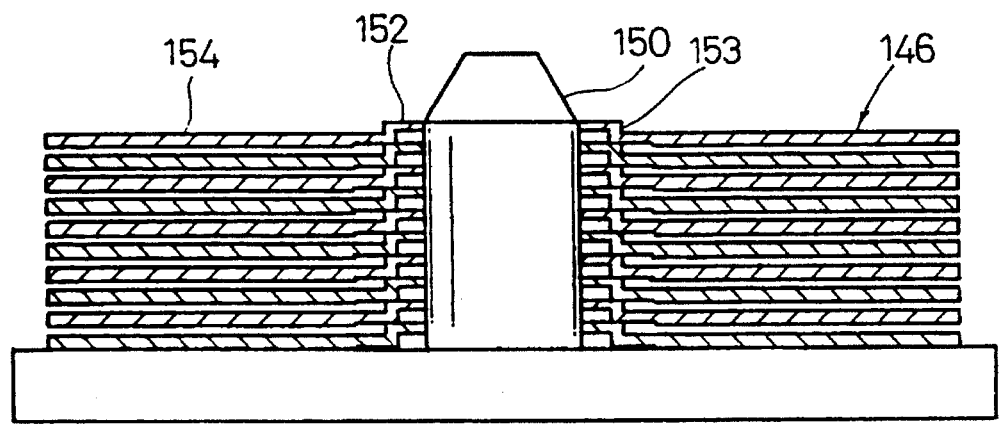

As shown in FIGS. 10 and 11, the suction pad 130 is connected to a distal end of the displaceable arm 144 of a carrier robot by the rods 143a, 143b. The rods 143a, 143b have respective lower ends secured in the attachment holes 141a, 141b, respectively, in the annular member 140, and respective upper ends movably supported in respective cylindrical holders 170a, 170b on the arm 144 for vertical displacement in the directions indicated by the arrows X, Y. When the suction pad 130 attracts a mini disc 146, the rods 143a, 143b are axially displaced in the direction X against the resiliency of the coil springs 145a, 145b, thereby dampening shocks applied to the mini disc 146. A pipe joint 172 (see FIG. 10) is threaded into the port 138, and a tube 174 connected to the source of vacuum is connected to the pipe joint 172.

Thereafter, the robot arm 144 is displaced to position the suction pad 130 over a stack of mini discs 146. Then, the robot arm 144 is lowered in the direction Y to bring the inner annular contact member 162 of the suction pad 130 into contact with the annular land 152 of the uppermost mini disc 146 near and around the hole 148 and also to bring the outer annular contact member 164 into contact with the annular information-free flat area adjacent to the annular step 153. Since the substantially central opening 132 of the suction pad 130 is aligned with the hole 148 of the mini disc 146, the suction pad 130 is held out of physical interference with the support rod 150. The annular member 140 can approach the mini disc 146 in a sufficiently free choice of directions. The inner annular contact member 162 and the outer annular contact member 164 can be brought into contact with the annular land 152 and the annular information-free flat area adjacent to the annular step 153, respectively, without contacting the recording region 154.

When the inner annular contact member 162 and the outer annular contact member 164 are held in contact with the annular land 152 and the annular information-free flat area adjacent to the annular step 153, respectively, and suction forces are generated in the suction holes 156a~156l which communicate with the port 138 connected to the source of vacuum through the pipe joint 172, the suction pad 130 reliably attracts the uppermost mini disc 146 under suction. The suction forces may start to be generated either at the same time that or before the inner annular contact member 162 and the outer annular contact member 164 are held in contact with the annular land 152 and the annular information-free flat area adjacent to the annular step 153, respectively.

Inasmuch as the inner annular contact member 162 and the outer annular contact member 164 are axially staggered with respect to each other to accommodate the annular step 153 between the annular land 152 and the recording region 154, and the flexible material such as silicone rubber of which the inner annular contact member 162 and the outer annular contact member 164 are made has a hardness of 20° or less, the inner annular contact member 162 and the outer annular contact member 164 are prevented from being turned into the suction holes 156a–156l, and can well attract the mini disc 146.

The suction pad 130 is thus capable of reliably attracting and carrying the mini disc 146 from one production line to another production line. The above process is repeated to carry all the stacked mini discs 146 supported by the support rod 150 successively to the other production line.

Figure 12:
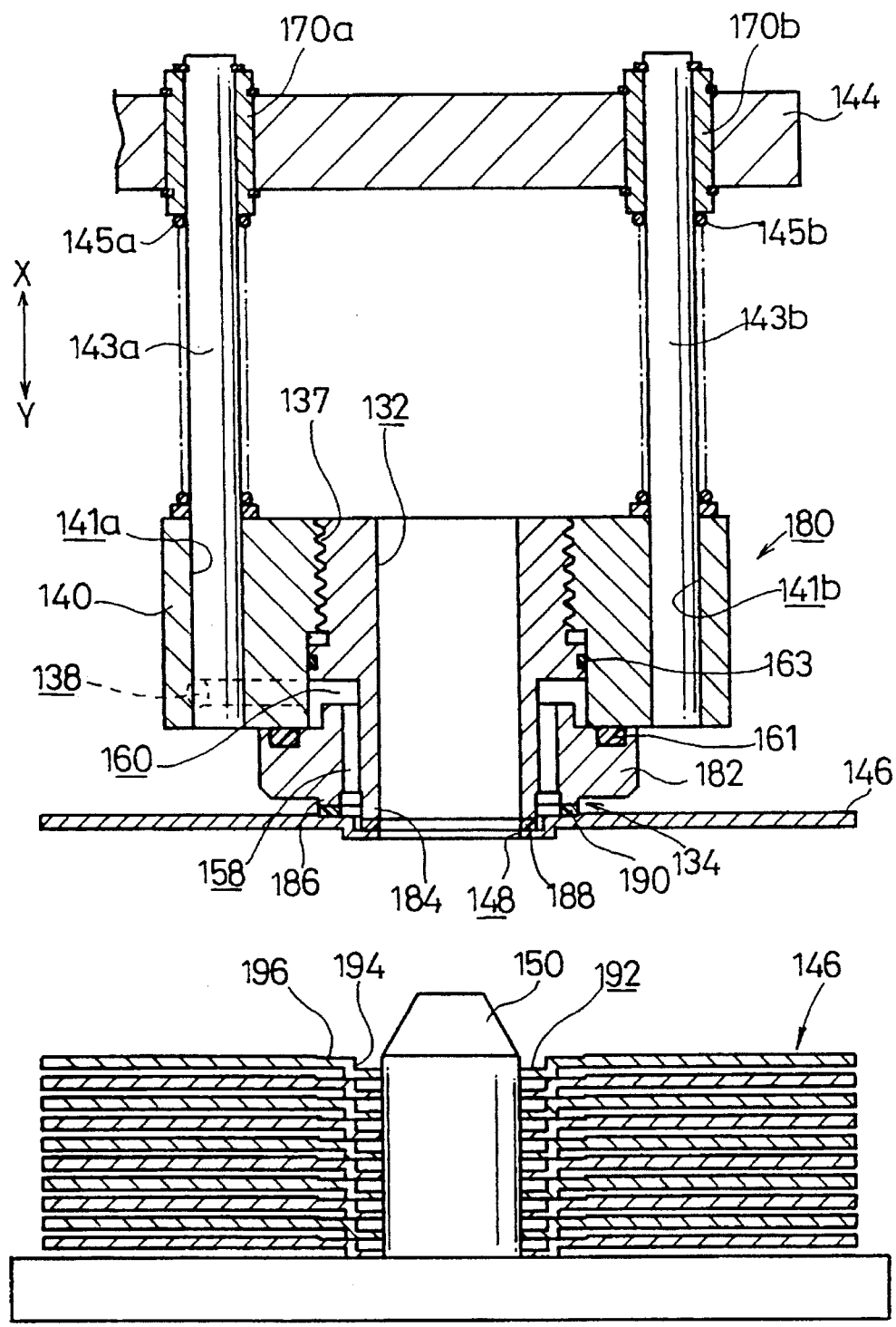
FIG. 12 is a vertical cross-sectional view of a suction pad according to a fourth embodiment of the present invention.
Figure 13A:
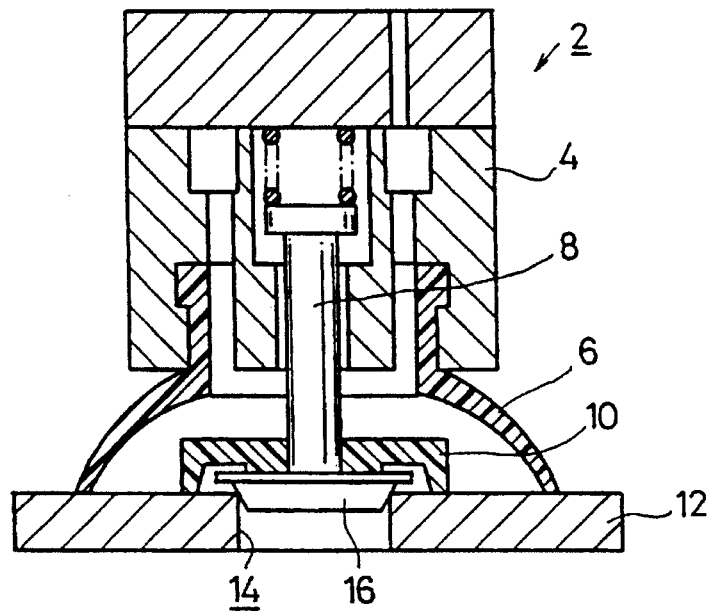
FIGS. 13A and 13B are vertical cross-sectional views of conventional suction pads, respectively.
Figure 13B:
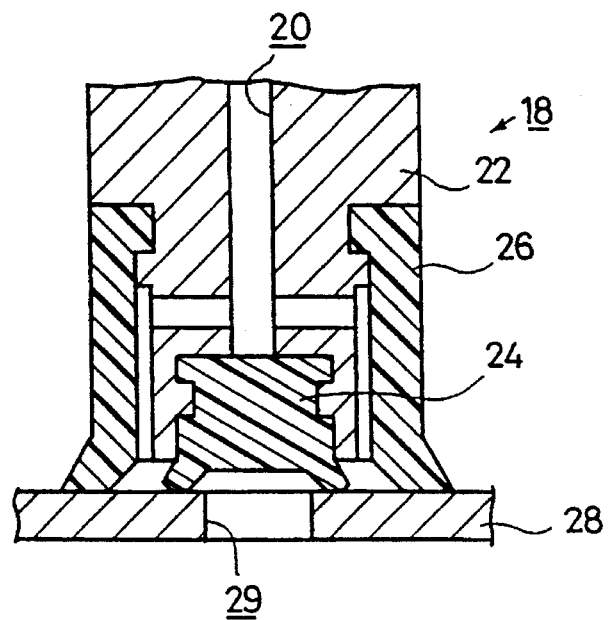

FIG. 12 shows a fourth embodiment of a suction pad 180 according to a fourth embodiment of the present invention. Those parts of the suction pad 180 which are identical to those of the suction pad 130 according to the third embodiment are denoted by identical reference numerals, and will not be described in detail below.

The suction pad 180 differs from the suction pad 130 according to the third embodiment in that an inner annular contact member 188 mounted on a first annular ridge 184 disposed on the bottom of a cylindrical member 182 is positioned axially downwardly of and radially inwardly of an outer annular contact member 190 mounted on a second annular ridge 186 disposed on the bottom of the cylindrical member 182. Stated otherwise, the inner annular contact member 188 projects axially a greater distance toward a workpiece than the outer annular contact member 190.

The workpiece comprises mini discs 146 to be attracted one at a time by the suction pad 180. The mini discs 146 are stacked upside down as shown in FIG. 12. Specifically, each of the mini discs 146 has an annular recessed area 192 near and around a central hole 148 defined in the mini disc 146 and an annular flat area 196 spaced radially outwardly from the annular recessed area 192 by an annular step 194. The inner annular contact member 188 serves to contact the annular recessed area 192, and the outer annular contact member 190 serves to contact the annular flat area 196. Therefore, the inner annular contact member 188 projects axially downwardly of the outer annular contact member 190 by a distance corresponding to the annular step 194.

The other details of the suction pad 180 are identical to those of the suction pad 130 according to the third embodiment.

As described above with reference to the third and fourth embodiments, the outer annular contact member 164 of the suction pad 130 and the inner annular contact member 188 of the suction pad 180 project axially downwardly of the inner and outer annular contact members 162, 190, respectively, by a distance corresponding to the annular steps 153, 194. Accordingly, the suction pads 130, 180 are capable of attracting either one of the face and reverse sides of the mini discs 146 for delivery.

In the third and fourth embodiments, mini discs 146 have been described as a workpiece to be attracted by the suction pads 130, 180. However, the suction pads 130, 180 can attract under suction other flat workpieces having a central hole, e.g., a compact disc, a laser disc, etc.

Although certain preferred embodiments of the present invention has been shown and described in detail, it should be understood that various changes and modifications may be made therein without departing from the scope of the appended claims.

What is claimed is:

1. A suction pad for attracting a workpiece having a data containing region and an interior hole defined substantially centrally therein radially inside of said data containing region, comprising:

an attractor of a flexible material for abutment against the workpiece along a peripheral region of said interior hole, wherein said attractor abuts against said workpiece adjacent said interior hole at a position radially inside from said data containing region of said workpiece; and a main body joined to said attractor and having a communication passage defined therein, for supplying suction forces from a source of vacuum through said communication passage to said attractor;

said main body having a through opening for alignment with said interior hole of the workpiece when the attractor is held in abutment against the workpiece along said peripheral region.

2. A suction pad according to claim 1, wherein said attractor and said main body are integrally formed with each other, further comprising a reinforcing member disposed between said attractor and said main body for holding said attractor against the peripheral region of the workpiece.

3. A suction pad according to claim 2, wherein each of said attractor and said main body is of a curved shape extending along the peripheral region of the hole defined in the workpiece and has opposite ends spaced from each other.

4. A suction pad according to claim 1, wherein each of said attractor and said main body is of a curved shape extending along the peripheral region of the hole defined in the workpiece and has opposite ends spaced from each other.

5. A suction pad according to claim 1, wherein said attractor has a pair of radially spaced annular contact members axially projecting different distances toward the workpiece, respectively, for contacting the peripheral region of the hole defined in the workpiece and an area of the workpiece which is radially spaced from the peripheral region by an annular step, respectively.

6. A suction pad according to claim 1, wherein said attractor comprises a flexible skirt having an arcuate shape corresponding to said peripheral region of said interior hole of the workpiece, said skirt having an inner wall surface inclined at an angle of 45° or less with respect to a plane of said workpiece.

7. In combination, a workpiece and a suction pad for attracting said workpiece, comprising:

a substantially disk-shaped workpiece having a data containing region and an interior hole defined substantially centrally therein radially inside of said data containing region;

said suction pad comprising:

an attractor of a flexible material for abutment against the workpiece along a peripheral region of said interior hole, wherein said attractor abuts against said workpiece at a position radially inside from said data containing region of said workpiece; and a main body joined to said attractor and having a communication passage defined therein, for supplying suction forces from a source of vacuum through said communication passage to said attractor;

said main body having a through opening for alignment with said interior hole of the workpiece when the attractor is held in abutment against the workpiece along said peripheral region.

8. A workpiece and suction pad according to claim 7, wherein said attractor and said main body are integrally formed with each other, further comprising a reinforcing member disposed between said attractor and said main body for holding said attractor against said peripheral region of the workpiece.

9. A workpiece and suction pad according to claim 8, wherein each of said attractor and said main body is of a curved shape extending along said peripheral region of said interior hole defined in the workpiece and having opposite ends spaced from each other.

10. A workpiece and suction pad according to claim 7, wherein each of said attractor and said main body is of a curved shape extending along said peripheral region of said interior hole defined in the workpiece and having opposite ends spaced from each other.

11. The workpiece and suction pad according to claim 7, said workpiece having an annular step thereon adjacent said interior hole, wherein said attractor has a pair of radially spaced annular contact members axially projecting at different distances toward said workpiece, for contacting said peripheral region of said interior hole defined in the workpiece and an area of the workpiece which is radially spaced from said peripheral region by said annular step, respectively.

12. A workpiece and suction pad according to claim 7, wherein said attractor comprises a flexible skirt having an arcuate shape corresponding to said peripheral region of said interior hole of the workpiece, said skirt having an inner wall surface inclined at an angle of 45° or less with respect to a plane of said workpiece.

\* \* \* \* \*